(12) United States Patent
Lee

(10) Patent No.: US 8,085,356 B2
(45) Date of Patent: Dec. 27, 2011

(54) DISPLAY PANEL, ASSEMBLING METHOD THEREOF AND LIQUID CRYSTAL DISPLAY

(75) Inventor: Hsing-Ying Lee, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 483 days.

(21) Appl. No.: 12/348,111

(22) Filed: Jan. 2, 2009

(65) Prior Publication Data
US 2009/0185106 A1 Jul. 23, 2009

(30) Foreign Application Priority Data
Jan. 18, 2008 (TW) .............................. 97101970 A

(51) Int. Cl.
*G02F 1/1333* (2006.01)
(52) U.S. Cl. ........... 349/54; 349/152; 349/153; 349/187
(58) Field of Classification Search .................. 349/149, 349/152, 153, 65, 54, 187; 445/24
See application file for complete search history.

(56) References Cited

U.S. PATENT DOCUMENTS
6,801,289 B2* 10/2004 Ichioka et al. ................ 349/152
6,882,397 B2* 4/2005 Hayata et al. ................ 349/149
* cited by examiner

*Primary Examiner* — Thoi Duong
(74) *Attorney, Agent, or Firm* — Lowe Hauptman Ham & Berner LLP

(57) ABSTRACT

A display panel including a first substrate, a second substrate, and a spacer is provided. The first substrate has a common potential line and at least one testing line separated from the common potential line, and the second substrate is disposed above the first substrate. The spacer is disposed between the first substrate and the second substrate and includes at least one conducting particle. The common potential line is electrically connected to the testing line via the conducting particle. An assembling method of the display panel mentioned above and a liquid crystal display using the display panel are also provided.

18 Claims, 10 Drawing Sheets

DISPLAY PANEL, ASSEMBLING METHOD THEREOF AND LIQUID CRYSTAL DISPLAY

RELATED APPLICATIONS

The present application is based on, and claims priority from, Taiwanese Application Number 97101970, filed Jan. 18, 2008, the disclosure of which is hereby incorporated by reference herein in its entirety.

BACKGROUND OF THE INVENTION

1. Field of the Invention

The present invention generally relates to a display panel, an assembling method thereof, and a liquid crystal display (LCD), in particular, to a display panel having at least one testing line, an assembling method thereof, and an LCD.

2. Description of Related Art

With the maturation of the photoelectric technology and semiconductor manufacturing technology in recent years, flat panel displays have been developed vigorously. Due to the advantages of a low voltage, no radiation, light weight, small volume, and the like, liquid crystal displays (LCDs) have gradually replaced the conventional cathode-ray tube (CRT) displays to become the mainstream of display products in recent years. An LCD mainly includes a display panel, a liquid crystal layer, and a backlight module. The display panel includes an upper substrate and a lower substrate, and the liquid crystal layer is sandwiched between the two substrates.

Generally, when manufacturing a display panel, in order to achieve the purpose of mass production, a single main substrate includes a plurality of substrates in size and is cut into a plurality of substrates after being tested and repaired. Specifically, FIGS. 1A and 1B are schematic top views of partial regions of a conventional main substrate. Referring to FIG. 1A, a main substrate 10A not only includes a plurality of substrates 12, but also includes a plurality of testing lines 14 for transmitting the test signals for a test on the substrates 12. After the substrates 12 have been tested, the testing lines 14 need to be disconnected, so that the substrates 12 operate independently. Since the disconnected testing lines 14 are floating, they may have influence on signals and image quality of the display panel. In most designs of the display panel, the testing lines 14 are configured on the regions of the main substrate 10A that can be cut out, for example, scribe lines 16. In this way, an available area of the main substrate 10A that can be utilized is limited. Moreover, additional steps may be added in the cutting process to cut off the regions where the testing lines 14 are located. The above two cases are both disadvantageous for improving the yield and reducing the production cost.

In addition, when manufacturing a small and medium-size display panel, in order to increase the number of substrates 12 generated by cutting the single main substrate 10A, the testing lines 14 are even designed at inner regions of the substrates 12. As shown in FIG. 1B, when a main substrate 10B is cut into substrates 12, the testing lines 14 still remain inside the substrates 12, i.e., corresponding to an inactive area R of the display panel which does not display images. Therefore, the testing lines 14 do not need to be configured on the scribe lines (as shown in FIG. 1A), so as to reduce the cutting steps of the single main substrate 10B. However, the disconnected testing lines 14 are still floating and are much adjacent to terminal portions or circuit regions of the substrates 12, thereby increasing the possibility of being interfered with the signals and the image quality of the display panel.

SUMMARY OF THE INVENTION

Accordingly, the present invention is directed to a display panel, capable of solving a problem that a testing line of a main substrate is interfered with signals of the display panel.

The present invention is further directed to a liquid crystal display (LCD), in which a common potential line thereof has a high signal transmission quality and a flexible wiring layout.

The present invention is further directed to an assembling method of a display panel, capable of reducing resistance of a common potential line when the common potential line transmits the signal.

As embodied and broadly described herein, the present invention provides a display panel, which includes a first substrate, a second substrate, and a spacer. The first substrate has a common potential line and at least one testing line separated from the common potential line. The second substrate is disposed above the first substrate. In addition, the spacer is disposed between the first substrate and the second substrate and includes at least one conducting particle therein, and the common potential line is electrically connected to the testing line via the conducting particle.

In an embodiment of the present invention, the display panel further includes a liquid crystal layer. The spacer may, for example, seal the liquid crystal layer between the first substrate and the second substrate.

The present invention further provides an LCD, which includes a backlight module, the above display panel, and a liquid crystal layer sandwiched between the first substrate and the second substrate.

In an embodiment of the display panel and the LCD, the first substrate further includes a plurality of conducting pads for electrically connecting the testing line and the common potential line individually, and the conducting pads are electrically connected to each other via the conducting particle. In addition, the conducting pads may be made of indium tin oxide (ITO) or indium zinc oxide (IZO).

In an embodiment of the display panel and the LCD, the spacer may seal the liquid crystal layer between the first substrate and the second substrate.

In an embodiment of the display panel and the LCD, the conducting particle is made of gold.

In an embodiment of the display panel and the LCD, the spacer further includes a gel for fixing the conducting particle.

In an embodiment of the display panel and the LCD, the second substrate has a common electrode electrically connected to the common potential line via the conducting particle.

The present invention further provides an assembling method of a display panel, which includes the following steps. First, a first main substrate and a second main substrate are provided. The first main substrate is adapted to be cut into a plurality of first substrates and the second main substrate is adapted to be cut into a plurality of second substrates. The first substrates respectively correspond to the second substrates, and each of the first substrates has a common potential line and at least one testing line. Next, a plurality of spacers is formed on the first main substrate or the second main substrate. The spacers are correspondingly formed at edges of the first substrates or the second substrates and each of the spacers includes at least one conducting particle therein. Then, the first main substrate is bonded to the second main substrate, such that the spacers are located between the first main substrate and the second main substrate and the conducting particles electrically connect the common potential line to the testing line on each of the first substrates. Finally, the first main substrate and the second main substrate are respectively cut into the first substrates and the second substrates.

In an embodiment of the assembling method of the display panel, the conducting particles are made of gold.

In an embodiment, the assembling method of the display panel further includes filling liquid crystal between the first substrates and the second substrates. In addition, after the liquid crystal is filled between the first substrates and the second substrates, the first main substrate is bonded to the second main substrate. In this case, a process for filling the liquid crystal between the first substrates and the second substrates may include a one drop fill (ODF) method. In addition, the assembling method of the display panel may also include filling the liquid crystal between the first substrates and the second substrates after the first main substrate is bonded to the second main substrate by the spacers. In this case, the process for filling the liquid crystal between the first substrates and the second substrates may include a vacuum injection method.

In an embodiment of the assembling method of the display panel, before the common potential line is electrically connected to the testing line correspondingly on each of the first substrates through the conducting particles, the method further includes performing a test on the first substrates by the testing lines.

In the display panel, the assembling method thereof, and the LCD of the present invention, the common potential line is electrically connected to the at least one testing line. Therefore, the testing line may be used as the common potential line. In other words, the testing line does not need to be cut off, which reduces the steps of the cutting process. On the other aspect, the testing line is electrically connected to the common potential line, which further reduces the resistance of the common potential line.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
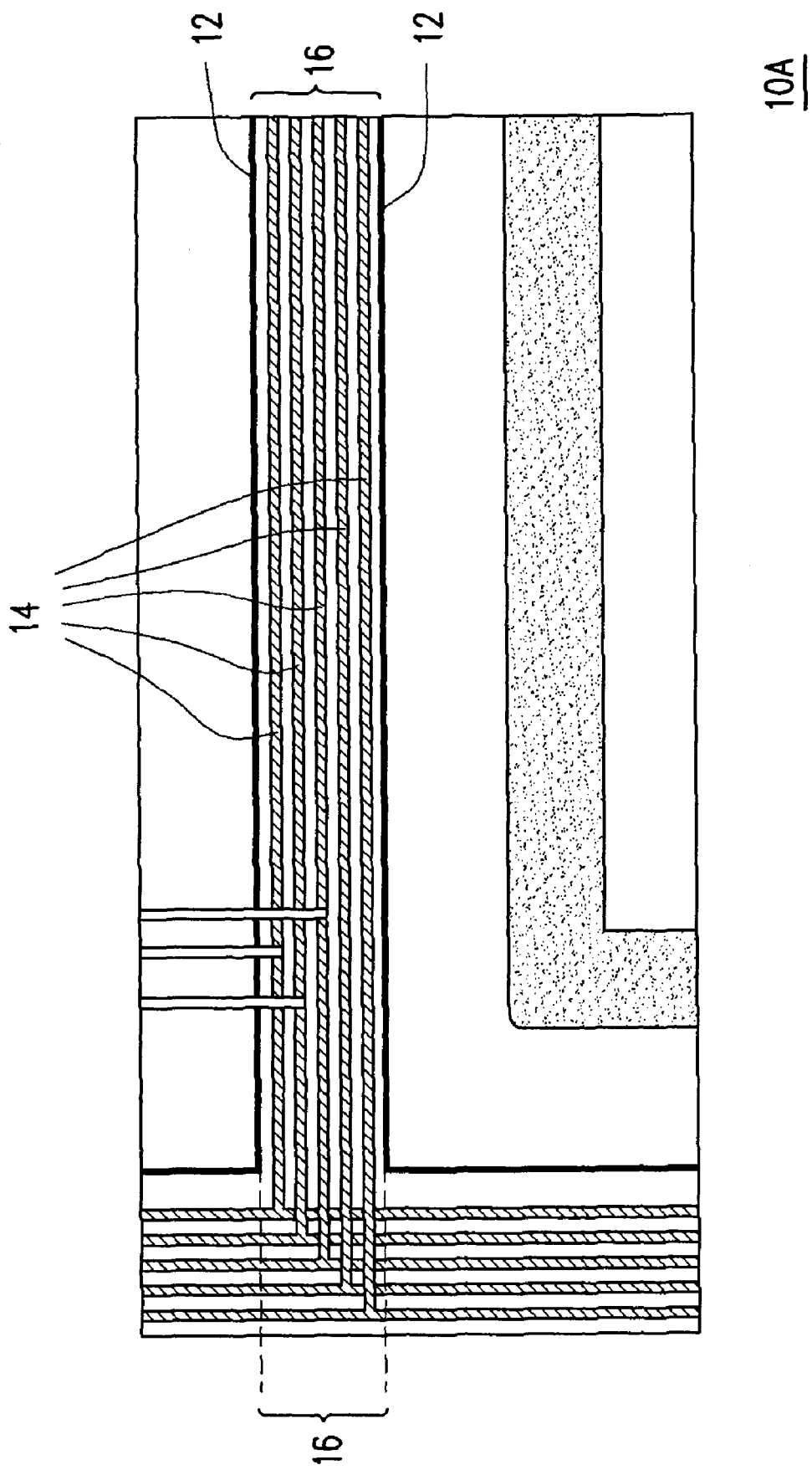
FIGS. 1A and 1B are schematic top views of partial regions of a conventional main substrate.
Figure 1B:
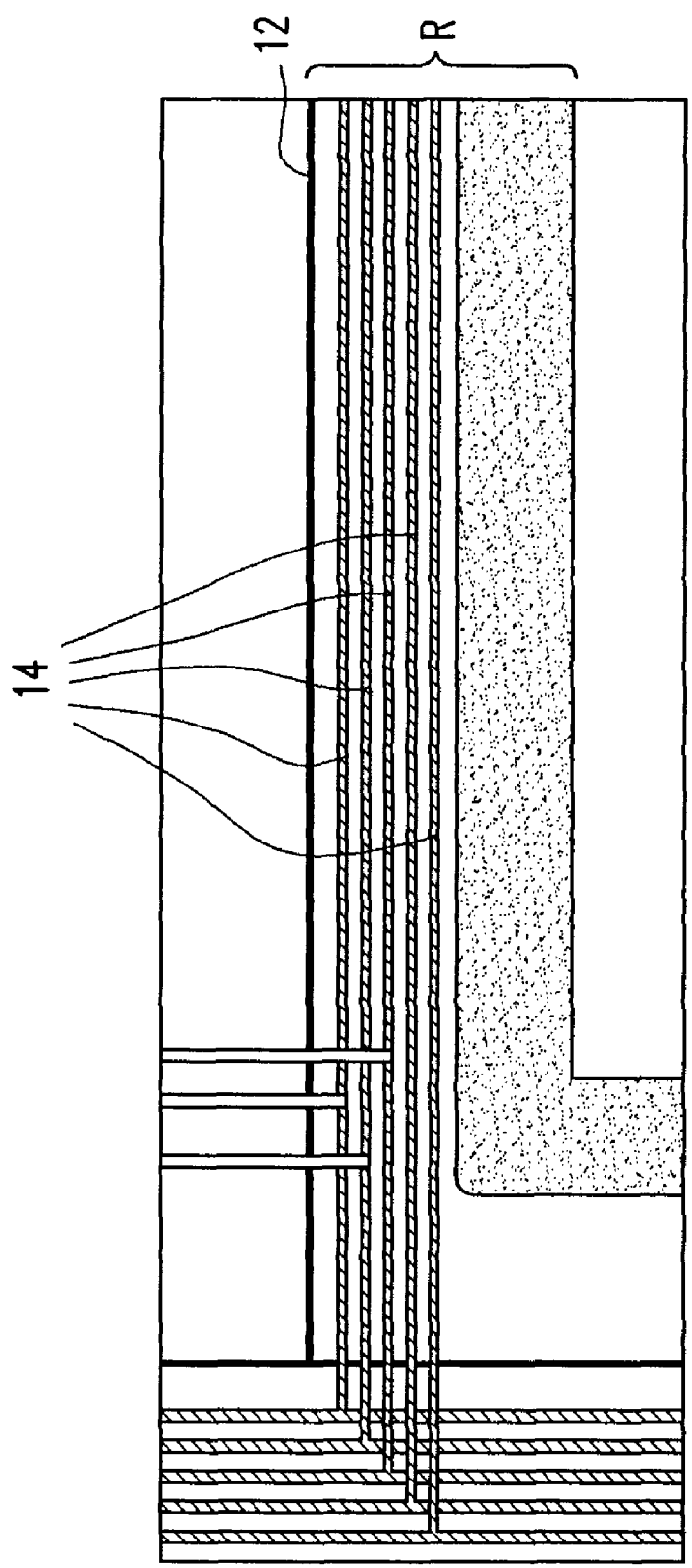

Reference will now be made in detail to the present preferred embodiments of the invention, examples of which are illustrated in the accompanying drawings. Wherever possible, the same reference numbers are used in the drawings and the description to refer to the same or like parts.

Figure 2A:
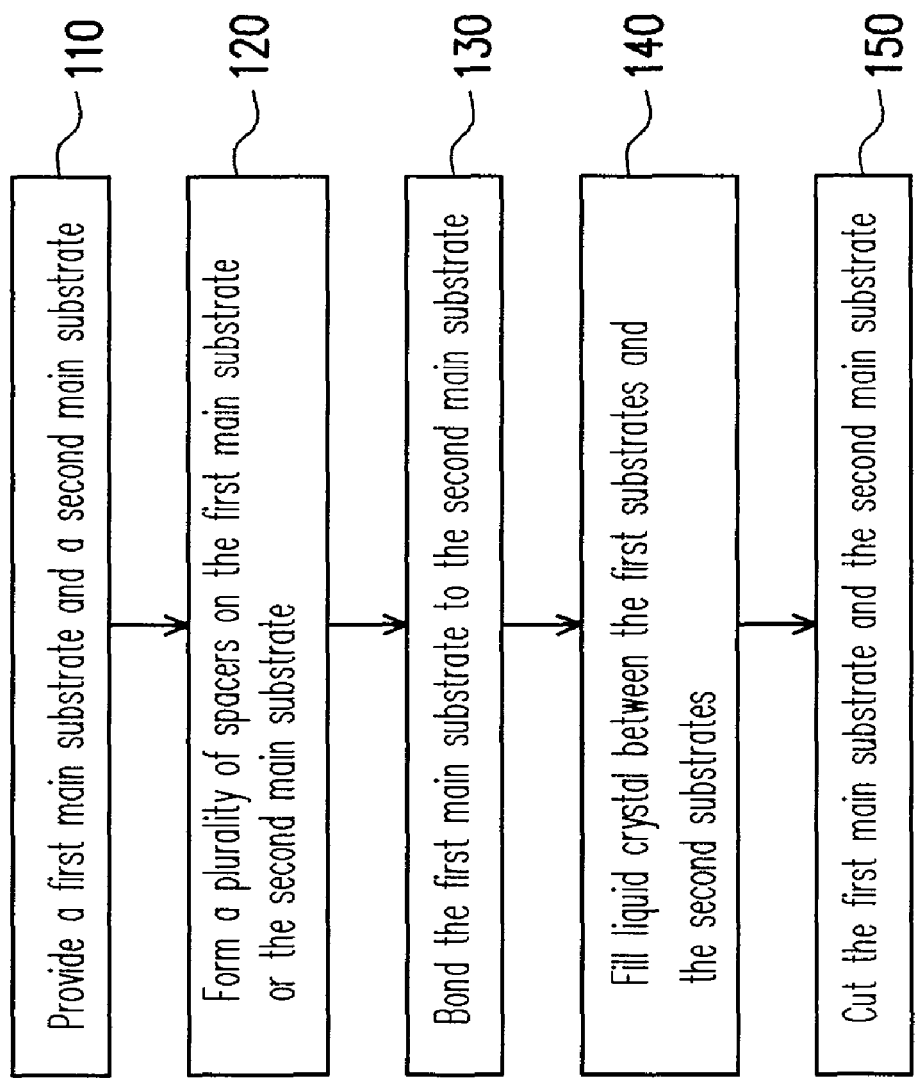
FIG. 2A is a schematic view of an assembling flow of a display panel according to an embodiment of the present invention.

FIG. 2A is a schematic view of an assembling flow of a display panel according to an embodiment of the present invention. Referring to FIG. 2A, first, in Step 110, a first main substrate and a second main substrate are provided. The first main substrate is adapted to be cut into a plurality of first substrates, and the second main substrate is adapted to be cut into a plurality of second substrates. Each of the first substrates corresponds to each of the second substrates and has a common potential line and at least one testing line separated from the common potential line. In addition, the first substrate may be further provided with a plurality of conducting pads for electrically connecting the common potential line and the testing line individually. Generally, after the first substrates have been manufactured on the first main substrate, a test may be performed on each of the first substrates by the above testing line, so as to achieve a desirable quality control. During the test, the common potential line and the testing line are electrically isolated to each other and transmit the corresponding signals.

Next, in Step 120, a plurality of spacers are formed on the first main substrate or the second main substrate. The spacers are correspondingly formed at edges of the first substrates or the second substrates, and each of the spacers includes at least one conducting particle therein. For example, the conducting particles within the spacers may be made of gold or another conducting material. In addition, the spacer may further include a gel for fixing the conducting particles, or the spacer may be used as a sealant. When the spacer is used as a sealant, the sealant encloses the edges of the first substrate or the second substrate, and the sealant includes, for example, at least one conducting particle therein. In addition, if the spacer is formed by the conducting particles and the gel for fixing the conducting particles, the spacer is, for example, at least one gold gel point.

Afterwards, in Step 130, the first main substrate is bonded to the second main substrate. At this time, the first substrates may be respectively bonded to the corresponding second substrates. After the first substrates are bonded to the second substrates, the common potential line on each of the first substrates is electrically connected to the testing line via the conducting particles within the spacer. When the spacer is a sealant, the first main substrate and the second main substrate may be bonded together by the spacer. When the spacer is a gold gel point or another spacer that cannot provide the bonding effect, a sealant is additionally disposed to bond the first main substrate to the second main substrate.

Then, in Step 140, liquid crystal is filled between the first substrates and the second substrates. In this step, the liquid crystal may be filled in the regions enclosed by the sealants. In practice, when the first main substrate is bonded to the second main substrate, the liquid crystal has not been filled in the regions enclosed by the sealants yet, so that an opening is reserved in each of the sealants, and thus, the liquid crystal is filled between the first substrates and the second substrates. A process for filling the liquid crystal is, for example, a vacuum injection method. Definitely, in other embodiments, the process for filling the liquid crystal is not limited to the vacuum injection method, but may be other appropriate manners. In addition, after the first main substrate is adhered to the second main substrate by the sealant, a thermal curing process, a light-curing process, or other appropriate curing process may be selected to cure the sealant according to the material of the sealant.

Afterwards, in Step 150, the first main substrate and the second main substrate are cut. In this step, the first main substrate and the second main substrate may be respectively cut into a plurality of first substrates and a plurality of second substrates. In addition, after the first main substrate and the second main substrate are bonded and then cut, the formed first substrate and second substrate as well as a liquid crystal layer there-between may together constitute a display panel. It should be noted that, in an assembling method of the display panel of this embodiment, Step 140 may be omitted. Instead, after the first main substrate and the second main substrate are bonded and cut, the liquid crystal is then filled, or the display panel not filled with the liquid crystal is shipped to a downstream manufacturer and then filled with the liquid crystal by the downstream manufacturer.

Figure 2B:
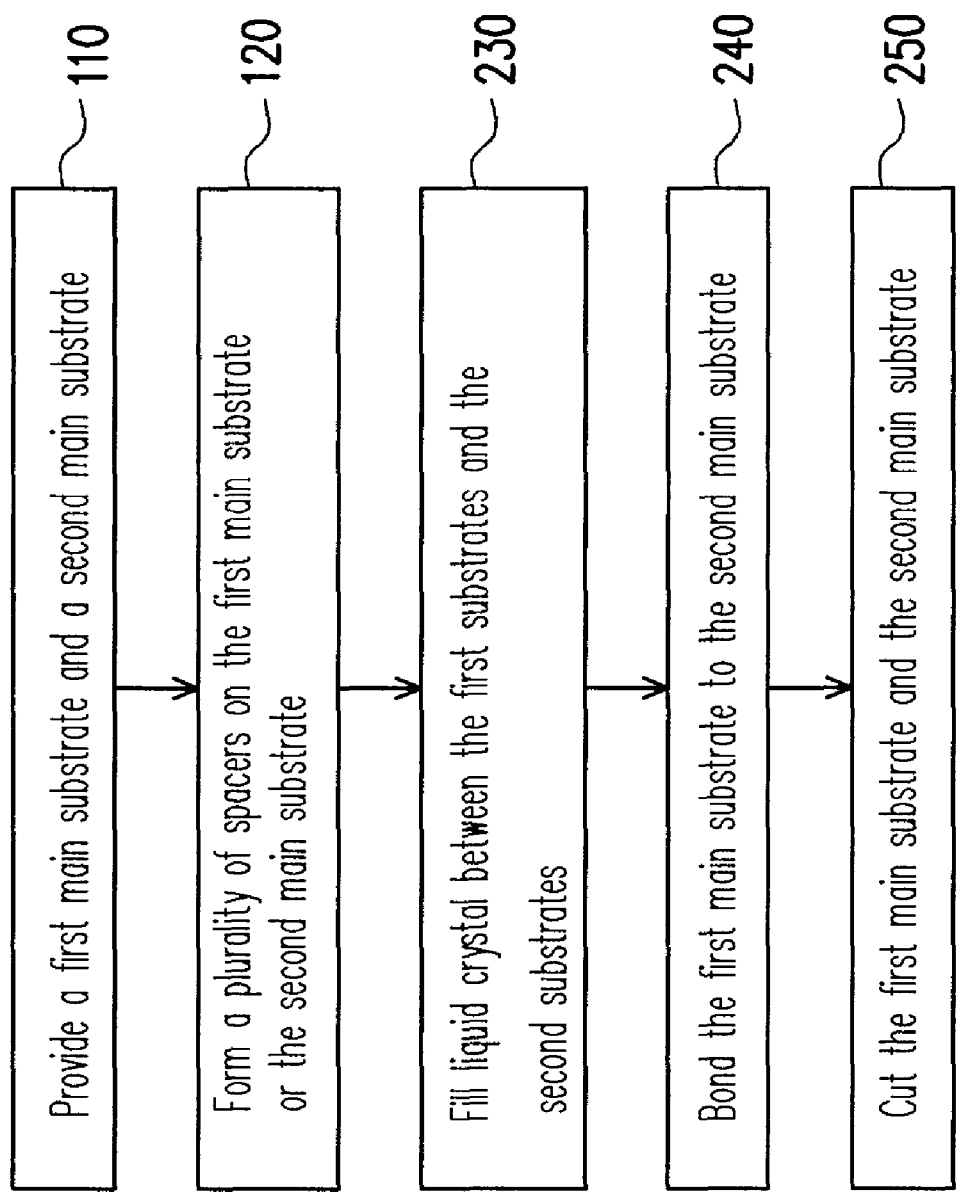
FIG. 2B is a schematic view of an assembling flow of a display panel according to another embodiment of the present invention.

FIG. 2B is a schematic view of an assembling flow of a display panel according to another embodiment of the present invention. Referring to FIG. 2B, in the assembling flow of the display panel of this embodiment, Steps 110 to 120 are the same as that described in the above embodiment, and will not be described herein again. In this embodiment, after Step 120 is completed, Step 230 is performed first, that is, the liquid crystal is filled between the first substrates and the second substrates. In this case, the process for filling the liquid crystal is, for example, a one drop fill (ODF) method. When the spacer is a sealant, the sealant may completely enclose edges of the first substrate or the second substrate, such that the liquid crystal is dropped into the region enclosed by the sealant. Definitely, when the spacer is not a sealant, a sealant may be additionally disposed at edges of the first substrate or the second substrate.

Then, in Step 240, the first main substrate is bonded to the second main substrate. At this time, the first substrates may be respectively bonded to the corresponding second substrates. After the first substrates are bonded to the second substrates, the common potential line on each of the first substrates is electrically connected to the testing line via the conducting particles within the spacer. When the spacer is not a sealant, at least one spacer as well as a sealant may be disposed on the first substrate, so as to bond the first main substrate to the second main substrate. Subsequently, in Step 250, the first main substrate and the second main substrate are respectively cut into the first substrates and the second substrates, so as to form a plurality of display panels. In addition, after the first main substrate is adhered to the second main substrate by the sealant, a thermal curing process, a light-curing process, or other appropriate curing process may be selected to cure the sealant according to the material of the sealant.

As described above, in the assembling method of the display panel of the present invention, the testing line on the first main substrate may be electrically connected to the common potential line, so as to be used by the cut first substrates. Therefore, the testing line do not need to be cut off from the first main substrate, which is helpful for reducing the processing time of the cutting operation in the manufacturing process of the display panel and further improving the efficiency. Embodiments of the display panel and a liquid crystal display (LCD) using the display panel of the present invention are provided below for illustration.

Figure 3:
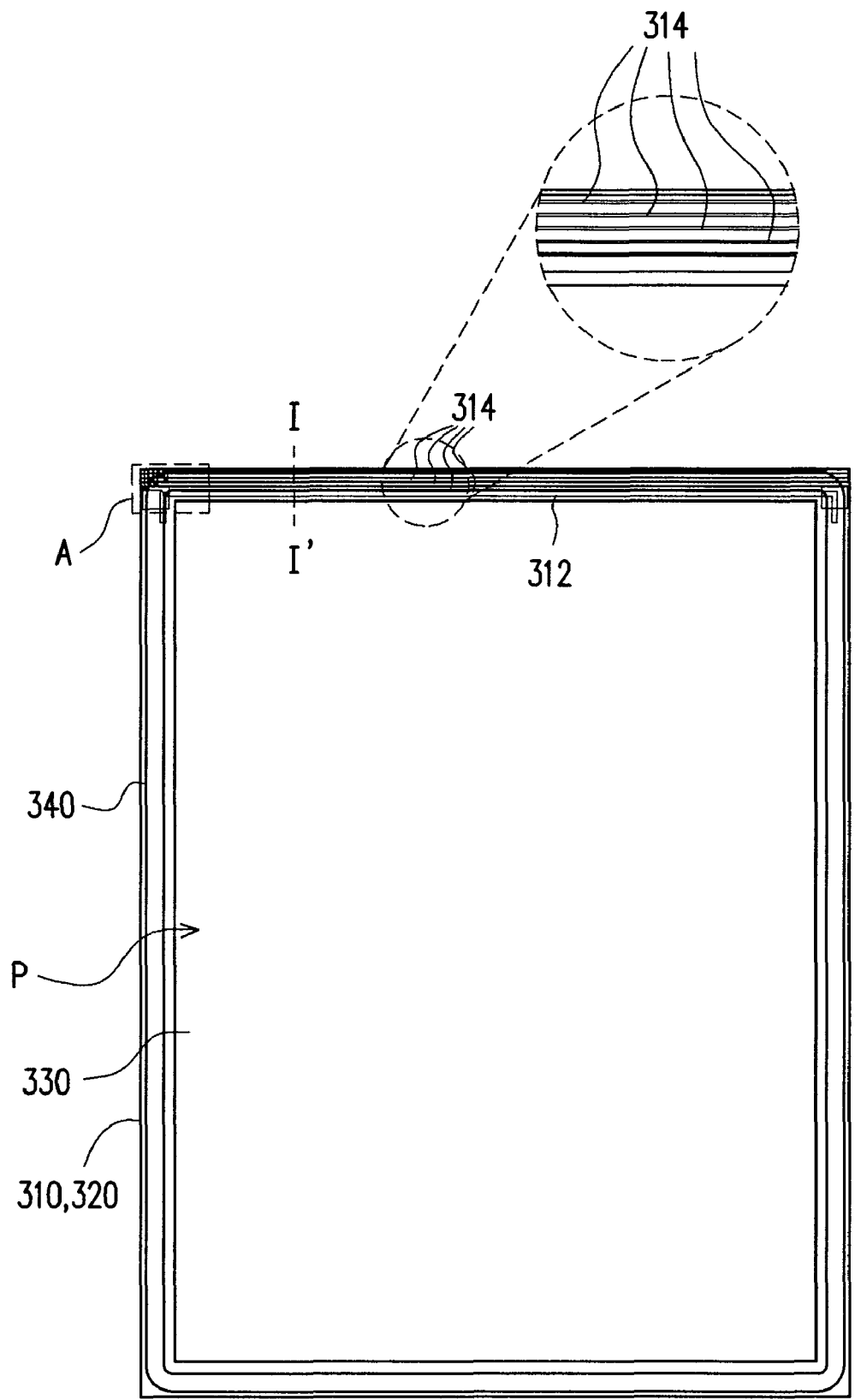
FIG. 3 is a schematic top view of a display panel according to an embodiment of the present invention.
Figure 4:
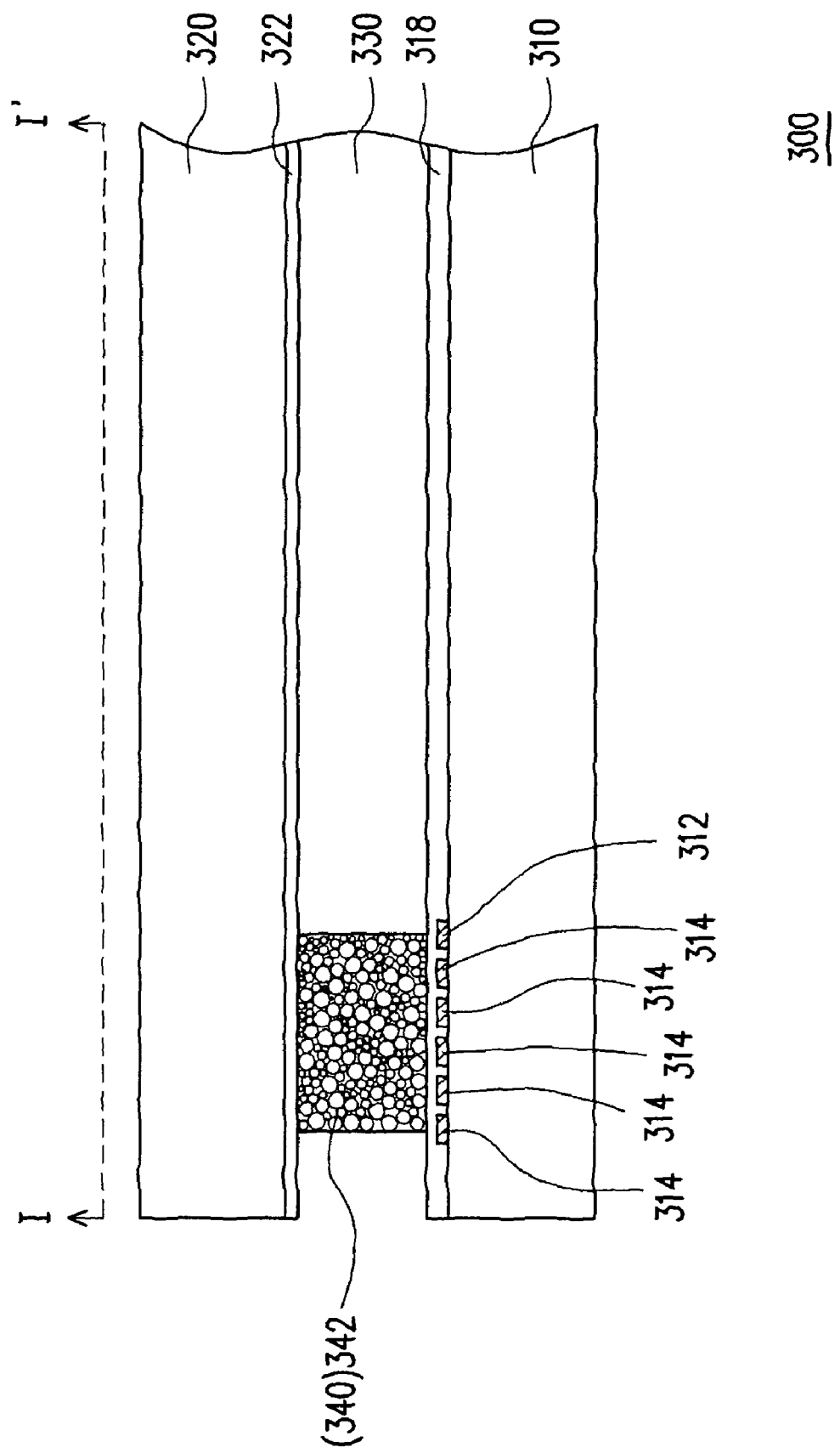
FIG. 4 is a schematic cross-sectional view taken along a section line I-I' of FIG. 3.

FIG. 3 is a schematic top view of a display panel according to an embodiment of the present invention, and FIG. 4 is a schematic cross-sectional view taken along a section line I-I' of FIG. 3. Referring to FIGS. 3 and 4, a display panel 300 of this embodiment includes a first substrate 310, a second substrate 320, and a spacer 340. The first substrate 310 has a common potential line 312 and at least one testing line 314 separated from the common potential line 312. Herein, a plurality of testing lines 314 is shown. The second substrate 320 is disposed above the first substrate 310. The spacer 340 is located between the first substrate 310 and the second substrate 320, and includes at least one conducting particle 342 therein. A plurality of conducting particles 342, for example, are shown in FIG. 4, and the spacer 340 may further include a gel for fixing the conducting particles 342 therein. In addition, the second substrate 320 further includes, for example, a common electrode 322 electrically connected to the common potential line 312 via the conducting particles 342. If the display panel 300 is a liquid crystal display panel, a liquid crystal layer 330 may be disposed between the first substrate 310 and the second substrate 320. However, the step of disposing the liquid crystal layer 330 is not limited to being performed by the manufacturer of the display panel 300, but may also be performed by a downstream manufacturer.

Figure 5A:
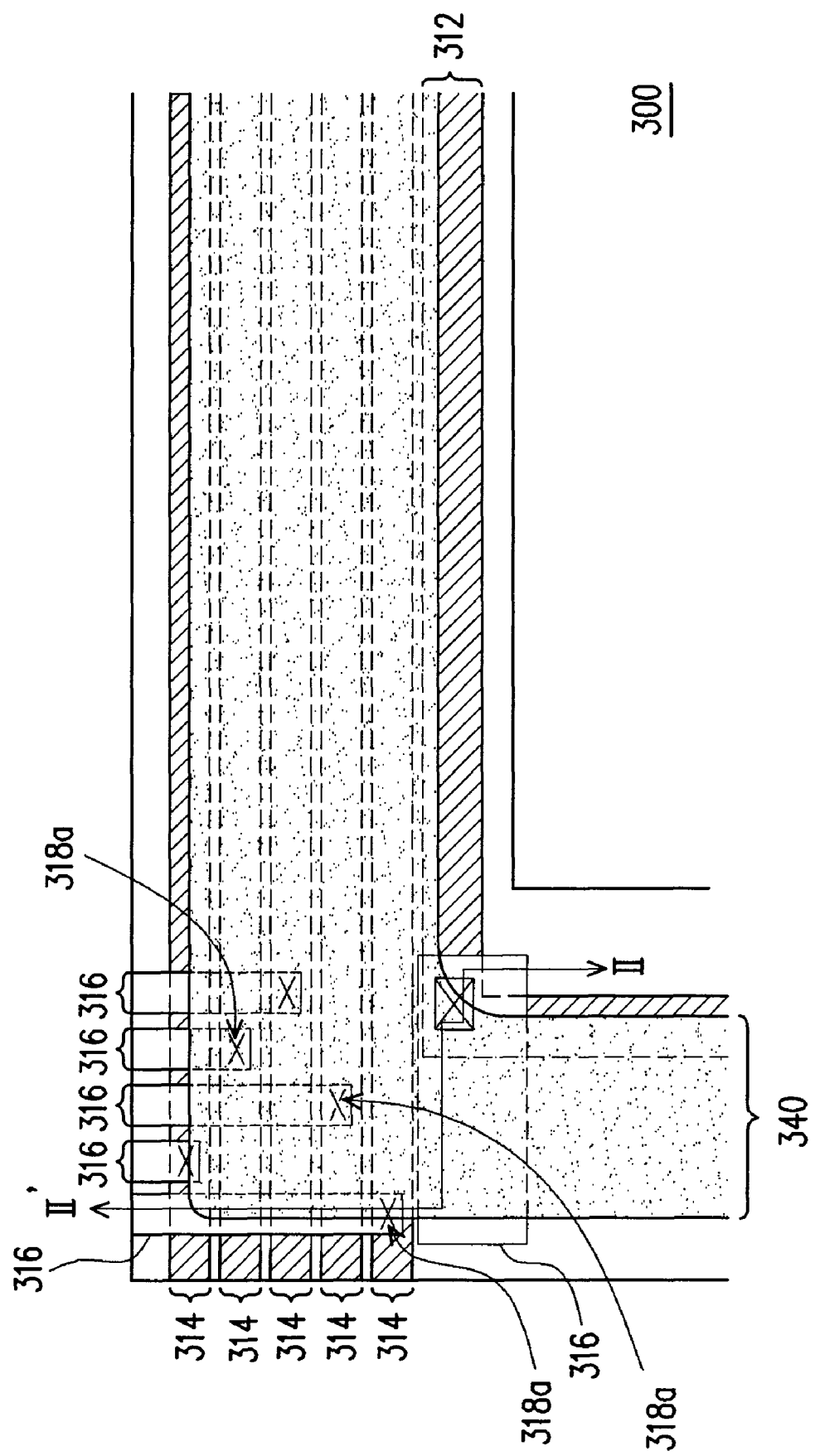
FIG. 5A is a partial enlarged view of a region A in the display panel of FIG. 3.
Figure 5B:
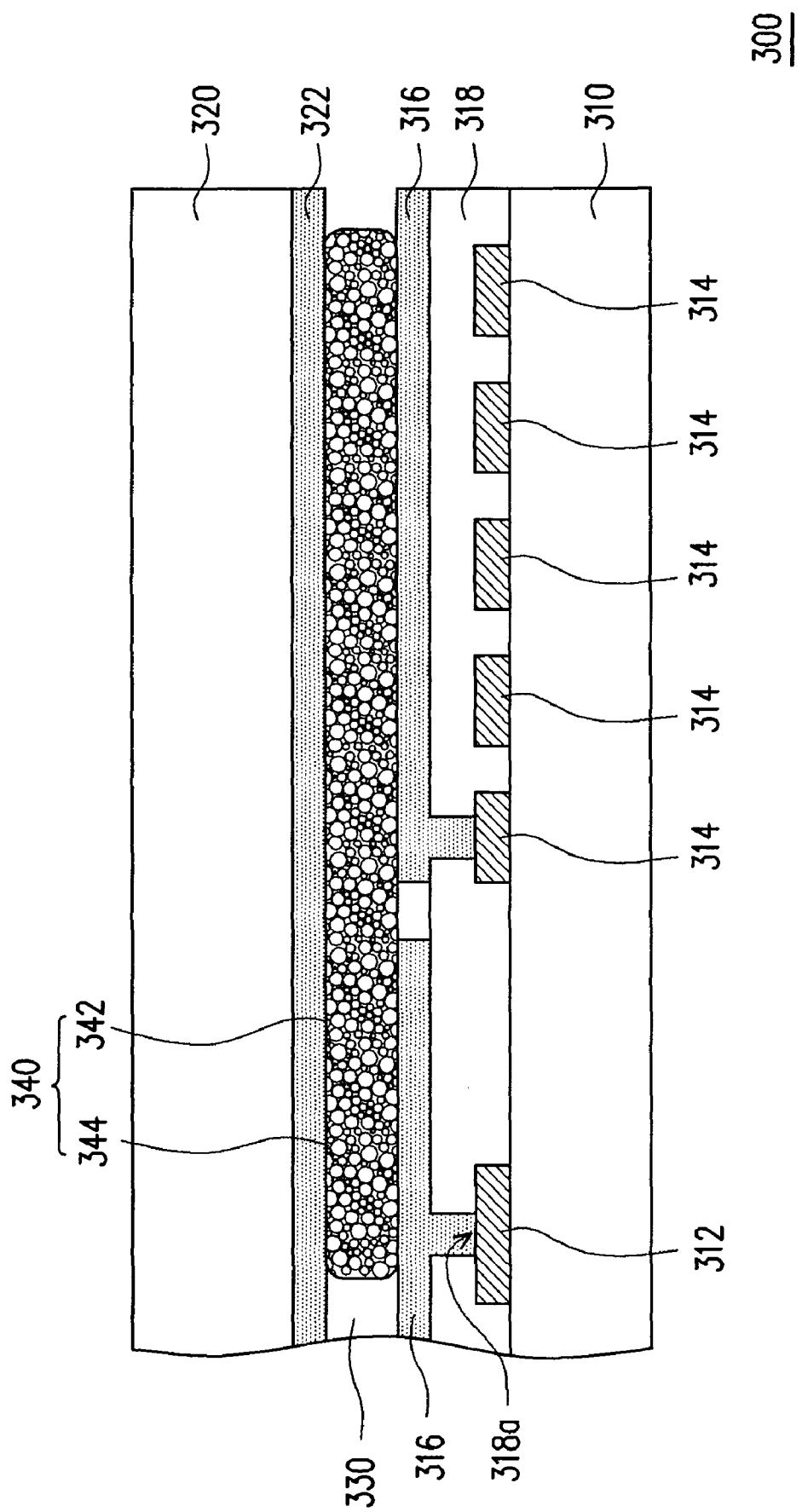
FIG. 5B is a schematic cross-sectional view of the display panel of FIG. 5A, taken along a section line II-II'.

FIG. 5A is a partial enlarged view of a region A in the display panel of FIG. 3, in which the second substrate is not shown. FIG. 5B is a schematic cross-sectional view of the display panel of FIG. 5A taken along a section line II-II', in which the second substrate is shown. Referring to FIGS. 5A and 5B, the first substrate 310 may further include a plurality of conducting pads 316. Each of the conducting pads 316 electrically connects the testing lines 314 and the common potential line 312 individually. In other words, each of the testing lines 314 and the common potential line 312 have the corresponding conducting pads 316 which are electrically isolated to each other on the first substrate 310 and may electrically connect to one another via the spacer 340 after the spacer 340 and the second substrate 320 are disposed on the first substrate 310. In practice, a dielectric layer 318 covers the testing lines 314 and the common potential line 312. Meanwhile, the dielectric layer 318 is configured with a plurality of contact windows 318a corresponding to the testing lines 314 and the common potential line 312, such that each of the conducting pads 316 electrically connects the corresponding testing line 314 or the common potential line 312 via each of the contact windows 318a. The conducting pads 316 are made of indium tin oxide (ITO) or indium zinc oxide (IZO). In addition, in other embodiments, the conducting pads 316 may also be made of another conducting material.

In this embodiment, the conducting particles 342 within the spacer 340 are made of, for example, gold, and the conducting pads 316 may be electrically connected to each other via the conducting particles 342. For example, the spacer 340 may be formed by a sealant 344 and one or more conducting particles 342 dispersed in the sealant 344, which is formed at edges of the first substrate 310 and the second substrate 320. In other words, the spacer 340 dispersed with the conducting particles 342 may completely enclose the edges of the first substrate 310 and the second substrate 320 or may be formed merely at partial regions of the edges of the first substrate 310 and the second substrate 320. When the spacer 340 completely encloses the edges of the first substrate 310 and the second substrate 320, the liquid crystal layer 330 may be sealed between the first substrate 310 and the second substrate 320 by the spacer 340.

If the spacer 340 is only formed by one or more conducting particles 342 instead of a sealant, the spacer 340 may also be formed merely at partial regions of the edges of the first substrate 310 and the second substrate 320. The common potential line 312 on the first substrate 310 is electrically connected to the testing lines 314 via the spacer 340, and even the common potential line 312 is electrically connected to the common electrode 322 on the second substrate 320 via the spacer 340. Definitely, the spacer 340 may further include a gel for fixing the conducting particles therein.

Furthermore, since the conducting pads 316 are electrically connected to each other via the conducting particles 342, the common potential line 312 and the testing lines 314 may also be electrically connected to each other. In practice, one or more testing lines 314 may be disposed in the display panel 300. Any one or more of the testing lines 314 may be electrically connected to the common potential line 312 via the conducting particles 342. Meanwhile, the configuration of the conducting particles 342 further enables the common electrode 322 on the second substrate 320 to be electrically connected to the common potential line 312. In this way, the testing lines 314 may be located in the range of the display panel 300. In addition, since the testing lines 314 are connected to the common potential line 312 in parallel, it further reduces the overall resistance of the common potential line 312.

Figure 5C:
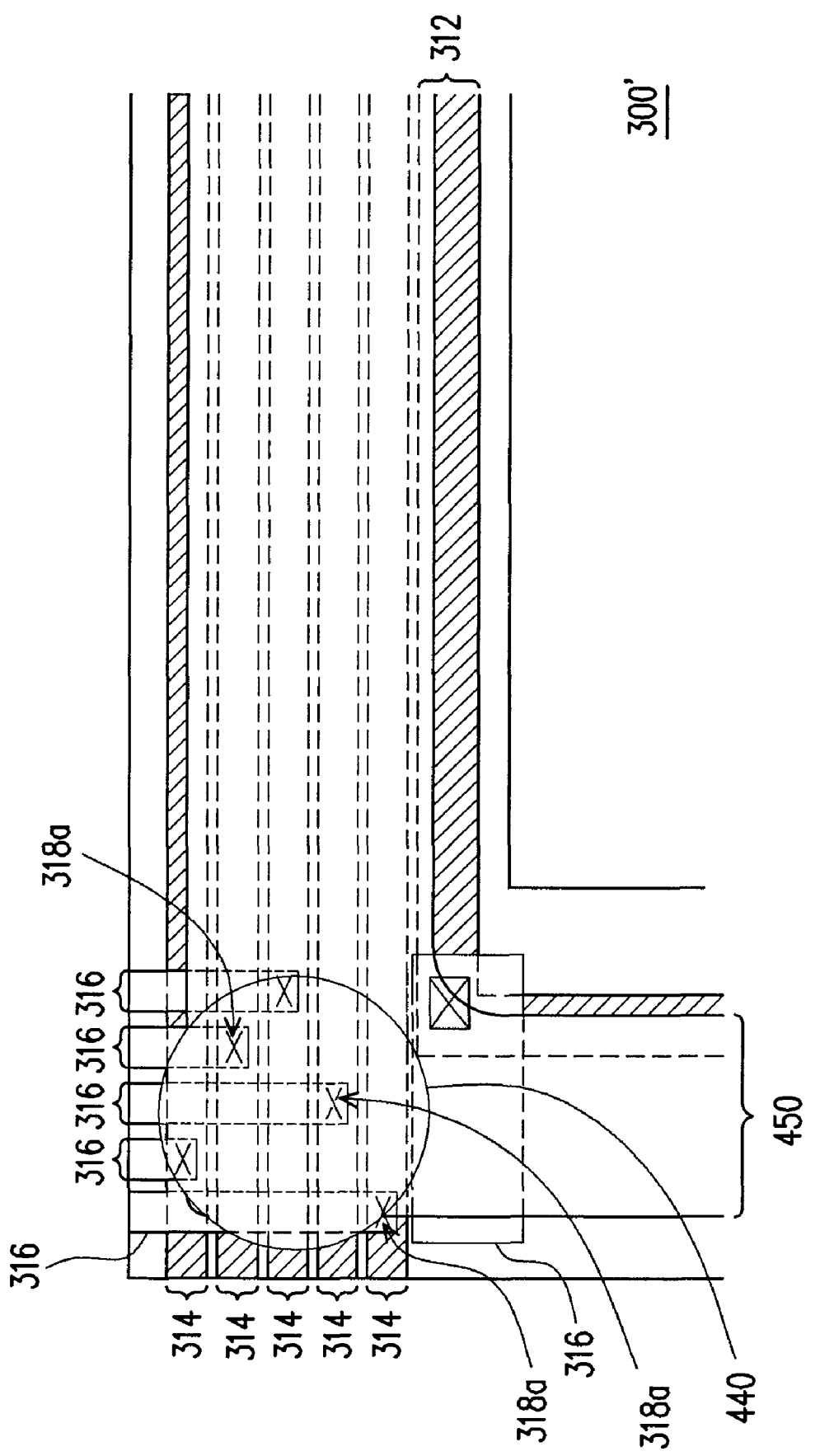
FIG. 5C is a partial enlarged view of a region A in a display panel according to another embodiment of the present invention.

FIG. 5C is a partial enlarged view of a region A in a display panel according to another embodiment of the present invention. Referring to FIG. 5C, a display panel 300' is substantially the same as the display panel 300. A spacer 440 disposed in the display panel 300' is a gold gel point. In addition, the display panel 300' further includes a sealant 450 disposed at edges of a substrate (not marked). The spacer 440 is disposed on the conducting pads 316 and at least includes gold particles and a gel. The conducting pads 316 are electrically connected to each other through the gold particles in the spacer 440, i.e., the common potential line 312 is electrically connected to the testing lines 314. In this way, the resistance of the common potential line 312 may be reduced effectively.

In practice, the spacer 440 is used to electrically connect the conducting pads 316, and a relation between the spacer 440 and the sealant 450 is not limited. In this embodiment, for example, the spacer 440 and the sealant 450 are partially overlapped. In other embodiments, the spacer 440 may be located outside or inside a region enclosed by the sealant 450. In addition, when the gold gel point is used as the spacer 440, the sealant 450 does not need to include any conducting particle, but is merely formed by a light-cured gel or a thermally cured gel.

Figure 6:
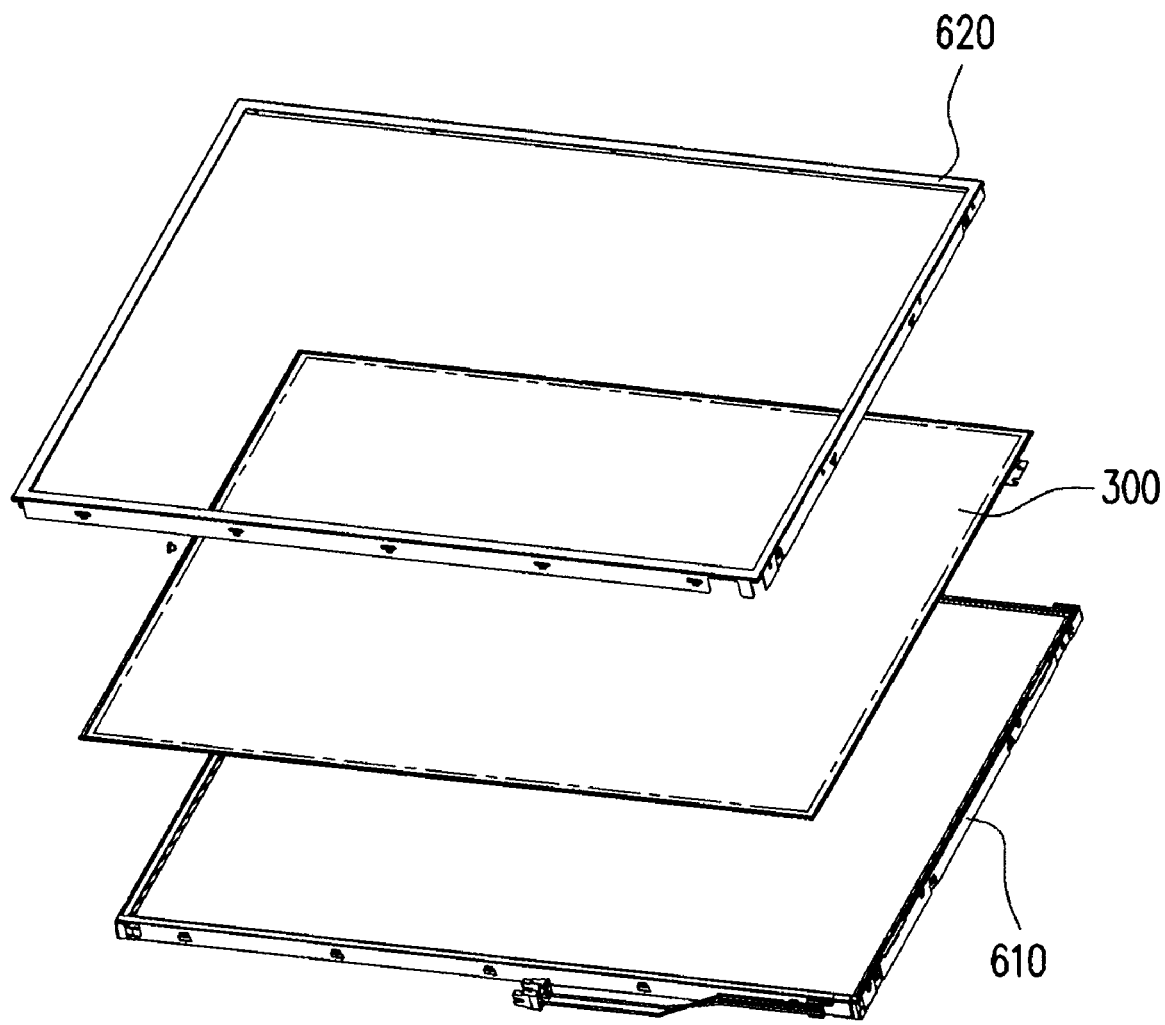
FIG. 6 is an exploded view of an LCD according to an embodiment of the present invention.

FIG. 6 is an exploded view of an LCD according to an embodiment of the present invention. Referring to FIG. 6, an LCD 600 includes a backlight module 610 and the display panel 300 shown in FIG. 3. The display panel 300 has a structure as described above. In this embodiment, the display panel 300 is a liquid crystal display panel, so that it is disposed on the backlight module 610. Definitely, the display panel 300 may also be replaced by other members falling in the spirit of the present invention. In addition, the LCD 600 may further include a front frame 620, which enables the display panel 300 to be more firmly disposed on the backlight module 610.

To sum up, in the display panel, the assembling method thereof, and the LCD of the present invention, the testing line that was originally useless after the test process is completed is electrically connected to the common potential line via the spacer. In this way, the portion of the main substrate where the testing line is disposed does not need to be cut off, which simplifies the steps in the cutting process to further shorten the processing time of the display panel. In addition, after the common potential line is electrically connected to the testing line via the spacer, the overall resistance of the common potential line is reduced, thereby enhancing the quality of the display panel and the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:
a first substrate, comprising a common potential line and at least one testing line separated from the common potential line;
a second substrate, disposed above the first substrate; and
a spacer, disposed between the first substrate and the second substrate, wherein the spacer comprises at least one conducting particle therein and the common potential line is electrically connected to the testing line via the conducting particle.

2. The display panel according to claim 1, wherein the first substrate further comprises a plurality of conducting pads for electrically connecting the testing line and the common potential line individually, and the conducting pads are electrically connected to each other via the conducting particle.

3. The display panel according to claim 2, wherein the conducting pads are made of indium tin oxide (ITO) or indium zinc oxide (IZO).

4. The display panel according to claim 1, further comprising a liquid crystal layer, wherein the spacer seals the liquid crystal layer between the first substrate and the second substrate.

5. The display panel according to claim 1, wherein the spacer further comprises a gel for fixing the conducting particle.

6. The display panel according to claim 1, wherein the second substrate further comprises a common electrode electrically connected to the common potential line via the conducting particle.

7. A liquid crystal display (LCD), comprising:
a backlight module; and
a display panel, disposed on the backlight module, wherein the display panel comprises:
a first substrate, comprising a common potential line and at least one testing line separated from the common potential line;
a second substrate, disposed above the first substrate;
a liquid crystal layer, disposed between the first substrate and the second substrate; and
a spacer, disposed between the first substrate and the second substrate, wherein the spacer comprises at least one conducting particle therein and the common potential line is electrically connected to the testing line via the conducting particle.

8. The LCD according to claim 7, wherein the first substrate further comprises a plurality of conducting pads for electrically connecting the testing line and the common potential line individually, and the conducting pads are electrically connected to each other via the conducting particle.

9. The LCD according to claim 8, wherein the conducting pads are made of indium tin oxide (ITO) or indium zinc oxide (IZO).

10. The LCD according to claim 7, wherein the spacer seals the liquid crystal layer between the first substrate and the second substrate.

11. The LCD according to claim 7, wherein the spacer further comprises a gel for fixing the conducting particle.

12. The LCD according to claim 7, wherein the second substrate further comprises a common electrode electrically connected to the common potential line via the conducting particle.

13. The LCD according to claim 7, further comprises a common voltage source for providing a common signal to the common potential line, wherein the common signal transmits from the common potential line to the testing line via the conducting particle.

14. An assembling method of a display panel, comprising:
providing a first main substrate and a second main substrate, wherein the first main substrate is adapted to be cut into a plurality of first substrates, the second main substrate is adapted to be cut into a plurality of second substrates, the first substrates respectively correspond to the second substrates, and each of the first substrates comprises a common potential line and at least one testing line which are electrically isolated to each other;
forming a plurality of spacers on the first main substrate or the second main substrate, wherein the spacers are correspondingly formed on each of the first substrates or each of the second substrates, and each of the spacers comprises at least one conducting particle therein;
bonding the first main substrate to the second main substrate, such that the spacers are disposed between the first main substrate and the second main substrate, and the conducting particles electrically connect the common potential line to the testing line after bonding the first main substrate to the second main substrate; and
cutting the first main substrate and the second main substrate respectively into the first substrates and the second substrates wherein each of the first substrates constitutes the display panel with the corresponding second substrate.

15. The assembling method of a display panel according to claim 14, further comprising filling liquid crystal between the first substrates and the second substrates.

16. The assembling method of a display panel according to claim 15, wherein after the liquid crystal is filled between the first substrates and the second substrates, the first main substrate is bonded to the second main substrate.

17. The assembling method of a display panel according to claim 15, wherein after the first main substrate is bonded to the second main substrate, the liquid crystal is filled between the first substrates and the second substrates.

18. The assembling method of a display panel according to claim 14, wherein before the common potential line is electrically connected to the testing line on each of the first substrates correspondingly, the method further comprises performing a test on the first substrates by the testing lines.

* * * * *